United States Patent [19]

Michael

[11] 4,271,997
[45] Jun. 9, 1981

[54] RACK FOR SKIS AND THE LIKE

[76] Inventor: Patrick T. Michael, 2027 W. Arbor Way, Orange, Calif. 92668

[21] Appl. No.: 84,091

[22] Filed: Oct. 12, 1979

[51] Int. Cl.³ .............................................. B60R 11/00
[52] U.S. Cl. ............................ 224/42.45 R; 224/917; 224/913; 211/60 SK
[58] Field of Search ................ 224/42.45 R, 327, 913, 224/917, 922; 211/60 SK, 89

[56] References Cited

U.S. PATENT DOCUMENTS

| | | | |
|---|---|---|---|
| 3,527,354 | 9/1970 | Sokolow | 211/60 SK |
| 3,701,436 | 10/1972 | Adams | 211/60 SK |
| 3,746,224 | 7/1973 | Folgner | 224/311 |
| 3,767,093 | 10/1973 | Pinkerton et al. | 224/913 X |
| 3,931,893 | 1/1976 | Elkins et al. | 224/42.45 R X |
| 4,063,646 | 12/1977 | Stahl, Jr. | 224/922 X |
| 4,170,801 | 10/1979 | Ward | 224/922 X |

FOREIGN PATENT DOCUMENTS 259627 1/1949 France ...................................... 224/917

Primary Examiner—Steven M. Pollard
Attorney, Agent, or Firm—Philip M. Hinderstein

[57] ABSTRACT

A rack primarily adapted for connection to the inside curved wall of a van for carrying skis and the like. The rack includes a pair of brackets permanently connectable to the wall of the van and being sufficiently flexible to be curved to follow the contour thereof. A plurality of cradle members are connectable to the brackets, each cradle member being designed to lock to the adjacent vertically-spaced cradle members for added strength and support and to dampen vibrations. The cradle members are made from a flexible material to allow for slight adjustments in spacing therebetween as the brackets curve. The cradle members support the skis with an angular orientation to allow the bindings to overlap and also to hold the skis away from the wall of the van to keep the bindings and tips from striking the van wall.

14 Claims, 4 Drawing Figures

RACK FOR SKIS AND THE LIKE

BACKGROUND OF THE INVENTION

1. Field of the Invention

The present invention relates to a rack for skis and the like and, more particularly, to a rack connectable to a curved surface for supporting skis in a manner such that the bindings of vertically-spaced skis overlap.

2. Description of the Prior Art

A wide variety of different types of racks have been designed for storing and transporting a variety of objects. Where the rack has been attachable to a vehicle for transporting sports equipment, the rack is virtually always connectable to the outside of the vehicle. U.S. Pat. No. 3,286,892, for example, discloses a bracket attachment for motor vehicles connectable to a vehicle roof for supporting fishing poles and the like. A vehicle externally-mounted fishing rod support is also disclosed in U.S. Pat. No. 2,797,851. Devices for supporting and transporting skis which are connectable to the outside of a vehicle are specifically disclosed in U.S. Pat. Nos. 3,854,641, 4,077,554, 4,078,708, and 4,084,735.

It is known to be far more desirable to support and transport sports equipment inside of a vehicle. This desirability comes from a variety of factors such as increased security resulting from the ability to lock the sports equipment within the vehicle and the fact that the sports equipment is isolated from external conditions as the vehicle is traveling. In spite of this desirability, very few devices have been developed for supporting sports equipment within a vehicle. The most common brackets which are designed for mounting within a vehicle are rifle brackets and typical examples are shown in U.S. Pat. Nos. 3,294,247 and 4,108,313. An example of a fishing pole carrier mountable on a vehicle top interiorly of the vehicle is described in U.S. Pat. No. 3,524,572.

The primary reason for not mounting racks inside a vehicle is that there is usually insufficient space for the sports equipment in the vehicle. However, vans are now very common and a van typically has sufficient space to carry fishing poles, skis, and the like. However, it is still not known to provide a bracket for attachment to the inside of a van, primarily because the inside wall of a van is curved and anything which is attached to such wall must be adapted for such curvature. Since brackets designed heretofore have not been adapted for mounting on a curved surface, it is still the practice to mount carrying brackets on the outside surfaces of vans and other recreational vehicles, as described in the patents previously discussed.

SUMMARY OF THE INVENTION

According to the present invention, there is provided a rack, primarily intended for use in transporting skis, which is readily connectable to a curved surface, such as the inside wall of a van. The rack is of the general type including a pair of horizontally-spaced, parallel, vertically-positioned, elongate brackets connectable to a support wall and a plurality of cradle members removably connectable to the brackets for supporting skis and the like at spaced locations along the lengths thereof. The brackets are made from a flexible material so that upon securing of same to a support surface, they will bend to follow the contour thereof. The cradle members have a single mounting stud which allows them to be attached securely to the bracket even though the same may be curved. Vertically-spaced cradle members are adapted to be locked together for added strength and support and to dampen vibrations. Furthermore, the cradle members are made from a flexible material so that they can adapt to the curved surface to which the brackets are attached.

Each cradle member is designed to support a pair of skis with an angular orientation so that the bindings of vertically-spaced skis overlap and do not interfere with each other. Each cradle member is designed to support skis away from the wall of the van to keep the bindings and tips from striking the van wall. A variety of other features make the present rack ideally suited for carrying skis and the like inside of a van.

Briefly, and in accordance with the present invention, each cradle member of the present rack comprises a generally C-shaped member for receiving skis and the like therein, a stud connected to the outside back surface of the C-shaped member for connecting the cradle to the bracket at a single vertical location on the bracket, a first rib extending across the inside surface of the C-shaped member, from the lower open end thereof toward the back thereof and positioned at an acute angle of approximately 28° to the horizontal so as to support a ski at such angle so that the bindings of vertically-spaced skis overlap and do not interfere with each other, and a second rib extending across the inside surface of the C-shaped member, from the first rib to the upper portion of the back thereof, and positioned to space skis supported thereby away from the bracket to keep the bindings and tips from striking the wall. Means are also provided for securing the skis within the cradle members.

OBJECTS, FEATURES, AND ADVANTAGES

It is therefore an object of the present invention to solve the problems associated with transporting sports equipment, such as skis, inside of a vehicle, such as a van. It is a feature of the present invention to solve these problems by providing a rack connectable to a curved surface. An advantage to be derived is that sports equipment, such as skis and the like, may be transported and stored in a location of safety. A further advantage is that sports equipment, such as skis and the like, can be transported without fear of damage by weather and other environmental conditions.

It is a further object of the present invention to solve the problems associated with supporting skis adjacent to a surface in close proximity to each other without the bindings interfering. It is a feature of the present invention to solve these problems by providing a rack including cradle members which support the skis with an angular orientation. An advantage to be derived is that multiple pairs of skis can be supported in a small space. Another advantage is that damage to and fouling of the bindings is eliminated.

Still other objects, features, and attendant advantages of the present invention will become apparent to those skilled in the art from a reading of the following detailed description of the preferred embodiment constructed in accordance therewith, taken in conjunction with the accompanying drawings wherein:

DESCRIPTION OF THE PREFERRED EMBODIMENT

Figure 1:
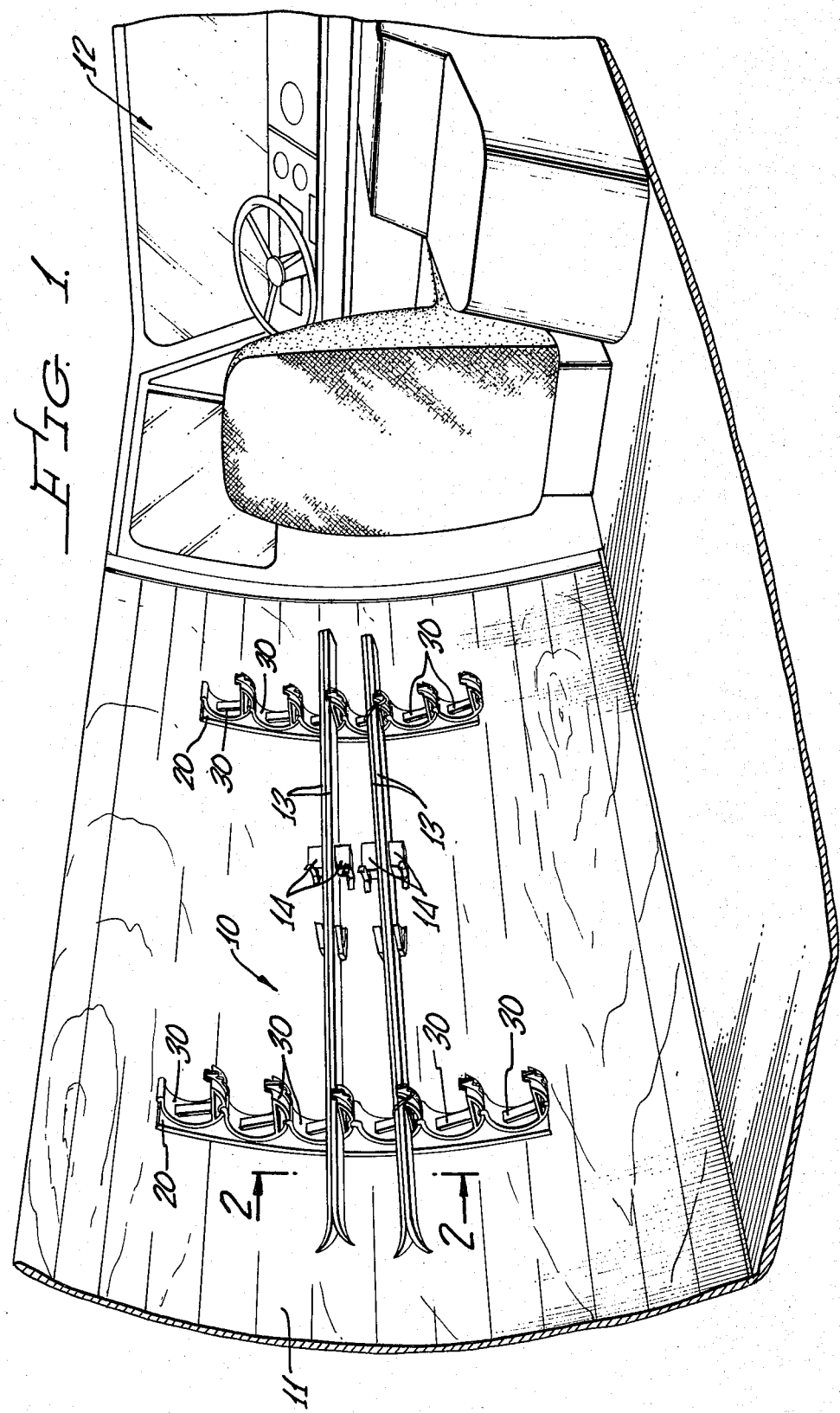
FIG. 1 is a perspective view of the inside of a van showing the present rack mounted to the interior curved wall thereof and supporting plural pairs of skis.

Referring now to the drawings, there is shown a rack, generally designated 10, which has been designed primarily for connection to the inside of a wall 11 of a van 12 for transporting pairs of skis 13. As will be explained more fully hereinafter, the design of rack 10 permits connection to wall 11 even though wall 11 is curved, as shown. However, while rack 10 will be described in its preferred embodiment for this purpose, it will be obvious to those skilled in the art that it may be used to support other similar objects and for connection to other support surfaces.

Rack 10 consists of two elements, the first element being a pair of identical brackets 20 which are connectable to wall 11 in any convenient manner, such as through the use of screws 21. As shown in FIG. 1, brackets 20 are adapted to be secured to wall 11 in horizontally-spaced, parallel, vertical position so that skis 13 extend therebetween. Each bracket 20 is an elongate member having a planar wall 22 from which a plurality of ribs 23 extend from one side thereof, perpendicular thereto. Ribs 23 serve the purpose of spacing wall 22 from wall 11, for reasons which will appear more fully hereinafter.

Wall 22 has a plurality of spaced holes 24 therein for receipt of screws 21 for connection of bracket 20 to wall 11. Wall 22 also has a plurality of vertically-spaced keyhole-like slots 25 therein. Each slot 25 includes a square portion 26 and a vertically-oriented rectangular portion 27 extending below portion 26.

Brackets 20 are preferably molded from a suitable aluminum material and may be provided in any length. If made from an aluminum material, bracket 20 may be readily cut to any desired length. Furthermore, if made from a somewhat flexible aluminum material, each bracket 20 will readily bend to follow the contour of wall 11 as screws 21 are used to connect bracket 20 thereto, as shown more clearly in FIG. 2.

Figure 2:
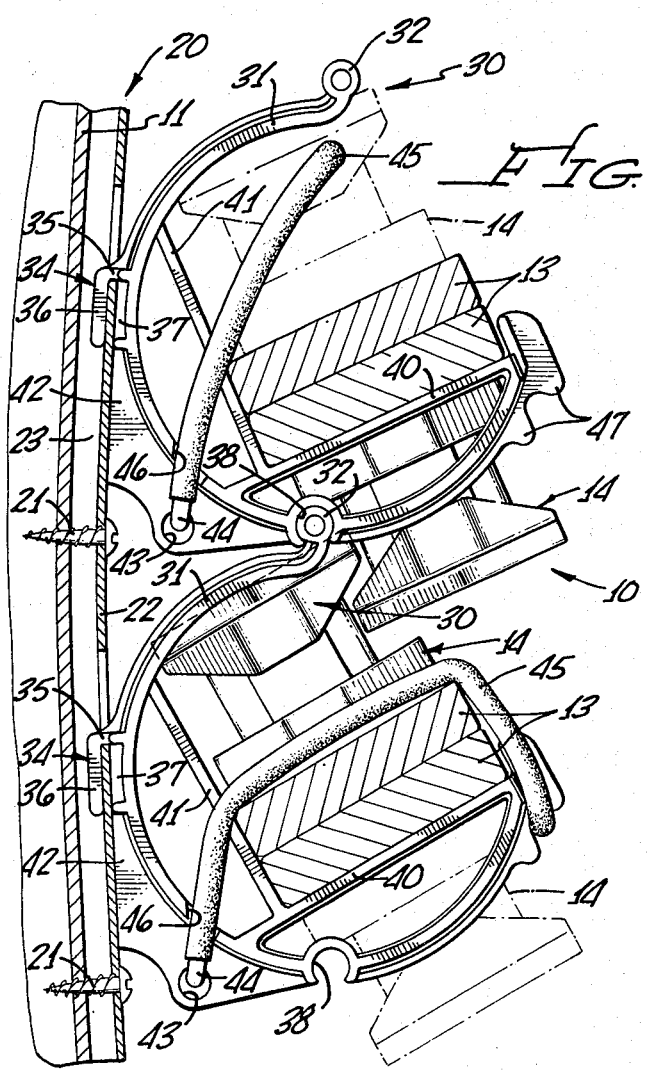
FIG. 2 is an enlarged sectional view taken along the line 2—2 in FIG. 1.
Figure 4:
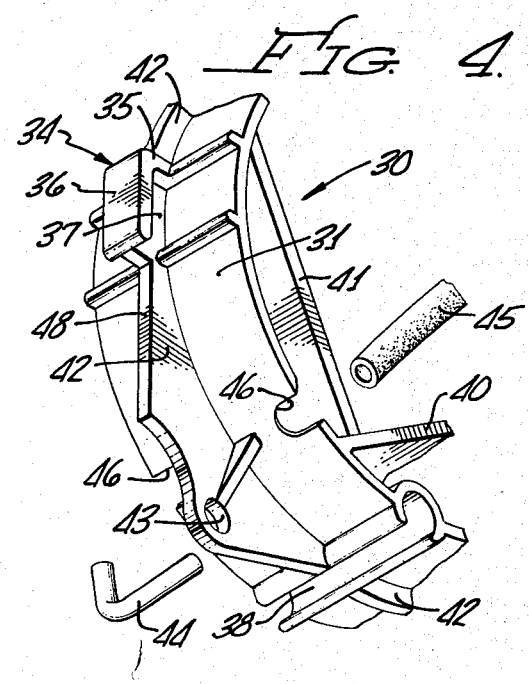
FIGS. 3 and 4 are exploded perspective views of portions of the rack of FIGS. 1 and 2 showing some of the details thereof.
Figure 3:
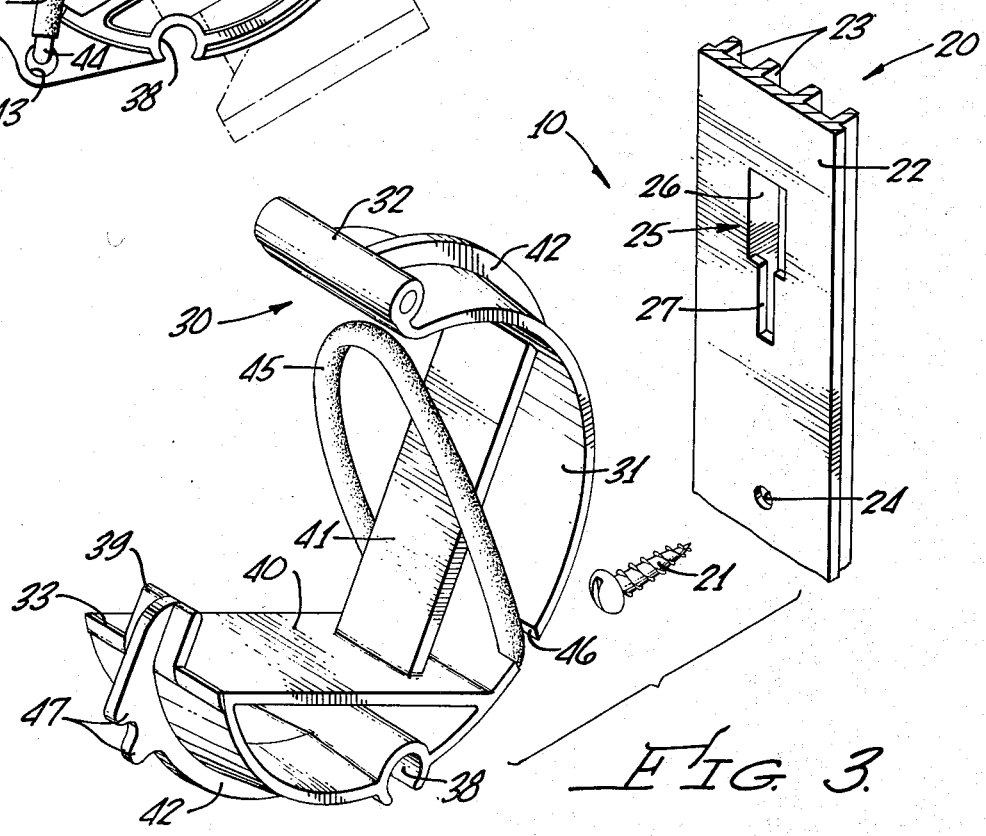

Referring now primarily to FIGS. 2–4, rack 10 includes a plurality of identical cradle members, generally designated 30. Each cradle member 30 includes a generally C-shaped member 31 having opposed open ends 32 and 33. An L-shaped mounting stud 34 has the end of one arm 35 thereof connected to the outside surface of the back of member 31 so that the other arm 36 thereof is positioned with a generally vertical orientation. A rib 37 extends between arm 36 and the back of C-shaped member 31, perpendicular to member 31 and arms 35 and 36.

The dimensions of leg 36 are approximately equal to the dimensions of portion 26 of slot 25 in bracket 20. This permits arm 36 of stud 34 to be extended through portion 26 of slot 25 whereupon rib 37 will be aligned with and directly above portion 27 of slot 25. Movement of cradle member 30 downwardly from this position causes rib 37 to enter portion 27 until it comes to rest on the bottom thereof, trapping arm 36 of stud 34 behind wall 22 of bracket 20. In this manner, stud 34 removably connects cradle member 30 to bracket 20 in a manner which prevents removal thereof except by elevating cradle 30 relative to bracket 20. It should also be noted that because only a single stud 34 is used to connect cradle member 30 to bracket 20, cradle members 30 are connectable to brackets 20 regardless of any curvature of bracket 20.

As seen in FIGS. 1 and 2, cradle members 30 are adapted to be connected to bracket 20 in vertically-spaced orientation and to be interlocked for added strength and support and to dampen vibrations. Connection is made most conveniently by a ball and socket type of connection. Specifically, end 32 of each cradle member 30 is made with a cylindrical shape, the cylinder having a horizontally-oriented axis, and the bottom surface of each cradle member 30 is formed with a lateral C-shaped slot 38, also having a horizontal orientation, the dimensions of slot 38 being the same as the dimensions of end 32 of cradle member 30. Thus, with two cradle members 30 positioned in vertically-spaced, parallel relationship, as shown in FIG. 2, the end 32 of one cradle member 30 extends into the slot 38 in the adjacent cradle member 30 positioned immediately thereabove. This ball and socket type of arrangement permits rotation of end 32 within slot 38.

The spacing between slots 25 in brackets 20 is such as to be equal to the spacing between adjacent studs 34 of two cradle members 30 which are interlocked in the manner shown in FIG. 2. However, as will be apparent to those skilled in the art, when bracket 20 is curved, this causes angular rotation of the cradle members 30 connected thereto. This is readily dealt with with the present invention. Specifically, by making each cradle member 30 from a suitable plastic material which is somewhat flexible, the top portion of each member 31 will readily flex inwardly as brackets 20 curve. This is shown in FIG. 2. Each cradle member 30 is preferably molded from a suitable plastic material with all of the portions described and to be described molded in a single integral part.

Each cradle member 30 includes a rib 40 which extends across the inside surface of member 31 from lower end 33 thereof to the back thereof. Rib 40 functions as a platform, as will be explained more fully hereinafter, and is preferably positioned at an angle of 28° relative to the horizontal.

Each cradle member 30 further includes a second rib 41 extending across the inside surface thereof, rib 41 extending from rib 40, adjacent the back surface of member 31, to the back surface of member 31, adjacent the top thereof. Each rib 41 functions as a spacer member, as will be described more fully hereinafter.

Cradle member 30 preferably includes a rib 42 which extends perpendicular to C-shaped member 31 along the entire back surface thereof for support purposes. At the lower back of member 31, rib 42 has a hole 43 therein for receipt of a V-shaped insert 44 which is adapted to receive the opposite ends of a length of surgical tubing 45. After being connected to the opposite ends of insert 44, surgical tubing 45 extends through opposed slots 46 on opposite sides of C-shaped member 31 so that the central portion of surgical tubing 45 extends across the inside of C-shaped member 31. Rib 42 on C-shaped member 31 is provided with integral tabs 47, adjacent end 33, around which the central portion of surgical tubing 45 may extend, as shown in FIG. 2, for securing an article within C-shaped member 31.

In operation, brackets 20 are readily connectable to wall 11 of van 12, or any other support surface, by means of screws 21 or other suitable attaching means. After brackets 20 are suitably positioned, screws 21 are extended through holes 24 and secured to wall 11. As screws 21 are tightened, brackets 20 will readily flex to follow the curvature of wall 11.

After brackets 20 are secured to wall 11 in parallel, horizontally-spaced, vertical position, the individual cradle members 30 are readily secured thereto by extending arms 36 of studs 34 through portions 26 of slots 25 in brackets 20 and then lowering the individual cradle members 30. Adjacent cradle members 30 are interconnected by extending ends 32 of C-shaped members 31 into the slots 38 in the immediately adjacent cradle member 30 positioned thereabove. This is preferably achieved prior to connection of cradle members 30 to brackets 20. In any event, if brackets 20 are curved, the upper portions of C-shaped members 31 will readily flex as the multiple cradle members 30 are connected to brackets 20.

After all cradle members 30 are positioned in brackets 20, inserts 44 may be inserted through holes 43 in ribs 42 and the opposite ends of lengths of surgical tubing 45 connected to inserts 44. Alternatively, inserts 44 and surgical tubing 45 may be connected to cradle members 30 before interconnection and connection to bracket 20. In any event, slots 46 in C-shaped members 31 hold the various lengths of surgical tubing 45 in an elevated position, as shown in FIGS. 2 and 3, so as not to obstruct the insertion of skis 13 into cradle members 30.

Rack 10 is now ready for receipt of skis and the like. As shown primarily in FIG. 2, two skis 13 are typically stored together with the bottom surfaces thereof in contact with each other and with bindings 14 of skis 13 extending in opposite directions. With a pair of skis 13 so positioned, they may be inserted into a pair of horizontally-aligned cradle members 30. The pair of skis 13 rest on rib 40, between end 33 of C-shaped member 31 and rib 41. End 33 of member 31 may be provided with a lip 39, as shown, to aid in retaining skis 13. Rib 41 holds skis 13 in spaced relationship relative to brackets 20 and wall 11 so that the tips of skis 13 and bindings 14 do not strike wall 11. Furthermore, rib 40 supports the pair of skis 13 with an angular orientation, the angle being approximately 28° relative to the horizontal. This minimizes the dimensions of cradle members 30 so that a maximum number of skis may be supported in a given space. That is, if ribs 40 were horizontal, the spacing between cradle members 40 would have to be increased to prevent the bindings 14 of adjacent skis 13 from interfering with each other. However, by supporting skis 13 with an angular orientation of approximately 28°, the bindings 14 of adjacent skis 13 overlap, as shown in FIGS. 1 and 2, and do not interfere with each other.

Once skis 13 are positioned within cradle members 30, the lengths of surgical tubing 45 may be wrapped therearound and brought into engagement with tabs 47. Multiple tabs 47 are provided to adjust the tension on surgical tubing 45. Surgical tubing is used since as tension is applied thereto, it tightens its grip on insert 44, preventing removal therefrom.

It can therefore be seen that according to the present invention, there is provided a rack 10, primarily intended for use in transporting skis 13, which is readily connectable to a curved surface, such as the inside wall 11 of a van 12. Rack 10 is of the general type including a pair of horizontally-spaced, parallel, vertically positioned, elongate brackets connectable to a support wall and a plurality of cradle members removably connectable to the brackets for supporting skis 13 and the like at spaced locations along the lengths thereof. According to the present invention, brackets 20 are made from a flexible material so that upon securing of same to a support surface, they will bend to follow the contour thereof. Cradle members 30 have a single mounting stud 34 which allows them to be attached securely to brackets 20 even though the same may be curved. Vertically-spaced cradle members 30 are adapted to be locked together for added strength and support and to dampen vibrations. Ribs 42 may be formed to provide a flat surface 48 for resting on walls 22 of brackets 20 for additional support and stability. Furthermore, cradle members 30 are made from a flexible material so that they can adapt to the curved surface to which brackets 20 are attached.

Each cradle member 30 is designed to support a pair of skis 13 with an angular orientation so that the bindings 14 of vertically-spaced skis 13 overlap and do not interfere with each other. Each cradle member 30 is designed to support skis 13 away from wall 11 of van 12 to keep bindings 14 and the tips of skis 13 from striking wall 11. A variety of other features make rack 10 ideally suited for carrying skis and the like inside of van 12.

While the invention has been described with respect to the preferred physical embodiment constructed in accordance therewith, it will be apparent to those skilled in the art that various modifications and improvements may be made without departing from the scope and spirit of the invention. Accordingly, it is to be understood that the invention is not to be limited by the specific illustrative embodiment, but only by the scope of the appended claims.

I claim:

1. In a rack for skis and the like of the type including a pair of horizontally-spaced, parallel, vertically-positioned, elongate brackets connectable to a support wall and a plurality of cradle members removably connectable to said brackets for supporting skis and the like at spaced locations along the lengths thereof, the improvement wherein each of said cradle members comprises:

a generally C-shaped member for receiving said skis and the like therein; and platform means extending across the inside surface of said C-shaped members, from the lower open end thereof toward said back thereof and positioned at an acute angle of at least 20° to the horizontal so as to support a ski and the like at said acute angle.

2. In a rack for skis and the like according to claim 1, the improvement wherein said platform means is positioned at an angle of approximately 28° to the horizontal.

3. In a rack for skis and the like according to claim 1, the improvement wherein each of said brackets is made from a flexible material so as to follow the contour of a support wall to which it is connected.

4. In a rack for skis and the like according to claim 1 or 3, the improvement wherein each of said cradle members further comprises:

means connected to the outside back surface of said C-shaped member for connecting same to said bracket at a single vertical location on said bracket.

5. In a rack for skis and the like according to claim 4, the improvement wherein each C-shaped member has opposed upper and lower open ends and wherein each C-shaped member includes, in the bottom surface thereof, means for receipt of the open upper end of a cradle member positioned immediately therebelow for interconnection of adjacent cradle members.

6. In a rack for skis and the like according to claim 5, the improvement wherein said interconnection between said cradle members is of the ball and socket type.

7. In a rack for skis and the like according to claim 5, the improvement wherein said upper end of each C-shaped member has a generally cylindrical shape, with a horizontally-oriented axis, and wherein said bottom surface of each C-shaped member includes a lateral C-shaped slot for receipt of the upper end of a cradle member positioned immediately therebelow.

8. In a rack for skis and the like according to claim 7, the improvement wherein said cradle members are made from a flexible material to permit movement of said ends of said C-shaped member towards each other.

9. In a rack for skis and the like according to claim 1, the improvement wherein each of said cradle members further comprises:

spacer means extending across the inside surface of said C-shaped member, from said platform means to said back of said C-shaped member, adjacent the top thereof, perpendicular to said platform means, so as to space a ski and the like from said brackets.

10. In a rack for skis and the like according to claim 1, the improvement wherein each of said cradle members further comprises:

a rib extending perpendicular thereto, along the entire back surface thereof, for support purposes.

11. In a rack for skis and the like according to claim 10, the improvement wherein each of said cradle members further comprises:

a length of tubing for securing skis and the like in said cradle members;

means connected to said rib, at the lower back of each cradle member, for supporting the opposite ends of said tubing;

said C-shaped member having opposed slots on opposite sides thereof through which said tubing extends; and said rib being provided with at least one integral tab adjacent the lower open end of said C-shaped member around which the central portion of said tubing may extend.

12. In a rack for skis and the like of the type including a pair of horizontally-spaced, parallel, vertically positioned, elongate brackets connectable to a support wall and a plurality of cradle members removably connectable to said brackets for supporting skis and the like at spaced locations along the lengths thereof, the improvement wherein each of said brackets is made from a flexible material so as to follow the contour of a support wall to which it is connected and wherein each of said cradle members comprises:

a generally C-shaped member for receiving said skis and the like therein, each C-shaped member having opposed upper and lower open ends, each C-shaped member including, in the bottom surface thereof, means for receipt of the open upper end of a cradle member positioned immediately therebelow for interconnection of adjacent cradle members; and means connected to the outside back surface thereof for connecting same to said bracket at a single vertical location on said bracket.

13. In a rack for skis and the like according to claim 12, the improvement wherein said upper end of each C-shaped member has a generally cylindrical shape, with a horizontally-oriented axis, and wherein said bottom surface of each C-shaped member includes a lateral C-shaped slot for receipt of the upper end of a cradle member positioned immediately therebelow.

14. In a rack for skis and the like according to claim 13, the improvement wherein said cradle members are made from a flexible material to permit movement of said ends of said C-shaped member towards each other.

* * * * *